B. HOPKINSON & L. G. P. THRING.
TRANSMISSION DYNAMOMETER.
APPLICATION FILED JUNE 11, 1907.
904,432.
Patented Nov. 17, 1908.
3 SHEETS—SHEET 1.
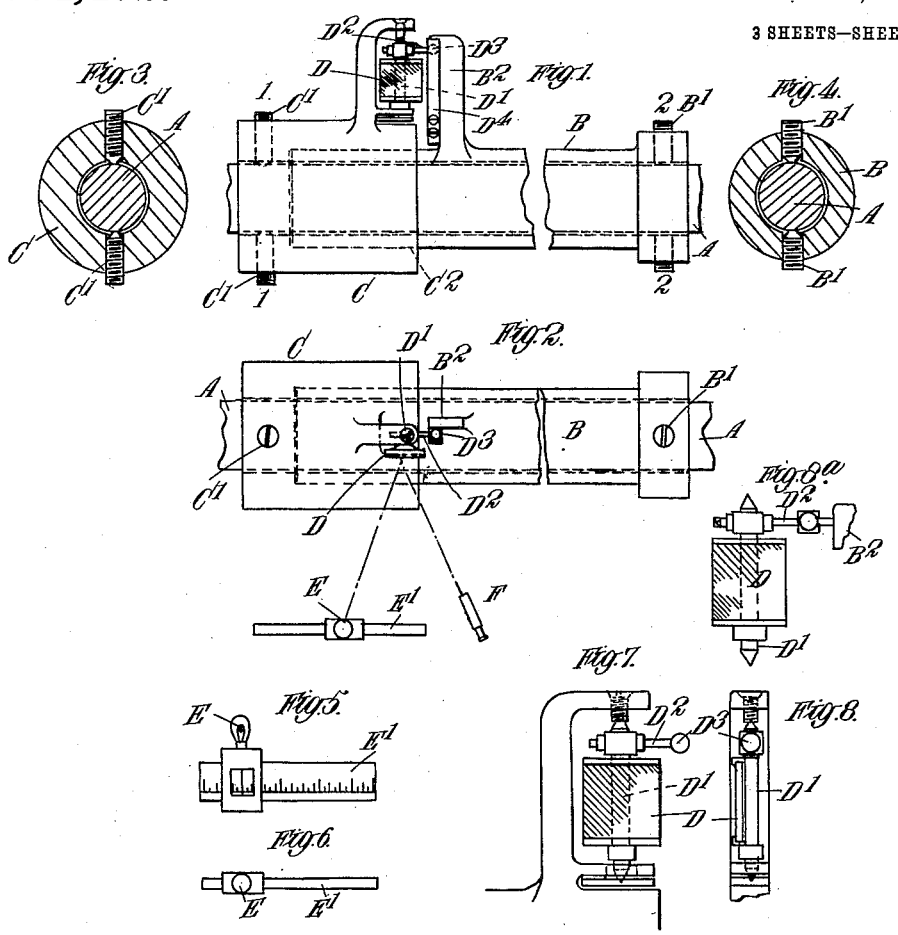
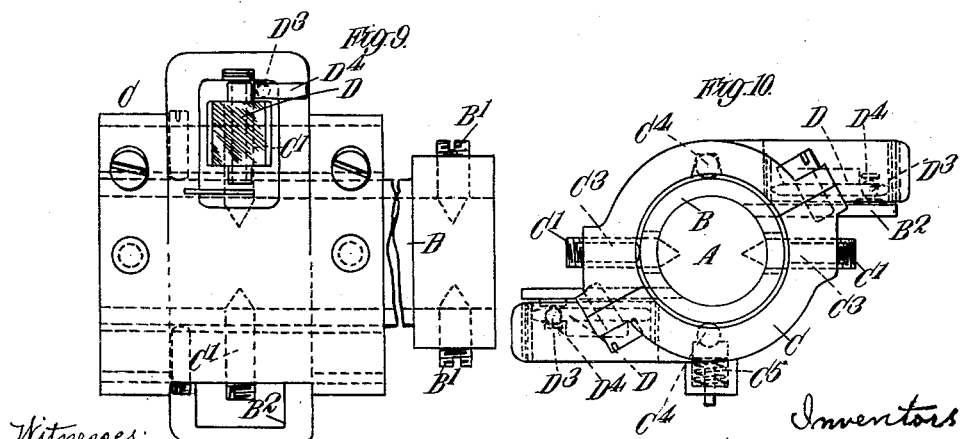
Witnesses:
V. E. Burner
W. Keane Small
Inventors:
Bertram Hopkinson and Leonard G. P. Thring
By Edson Bros, Attorneys B. HOPKINSON & L. G. P. THRING.
TRANSMISSION DYNAMOMETER.
APPLICATION FILED JUNE 11, 1907.
904,432.
Patented Nov. 17, 1908.
3 SHEETS—SHEET 3.
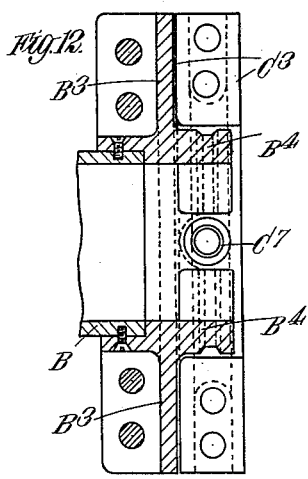
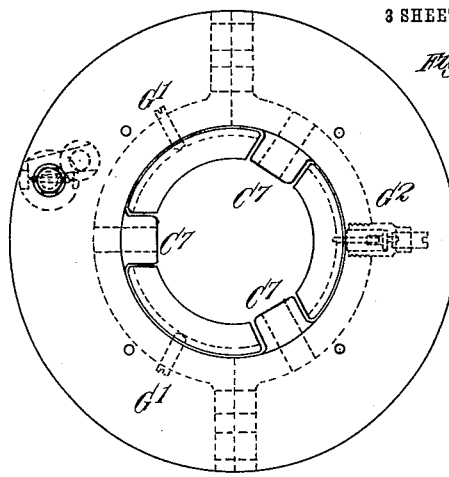
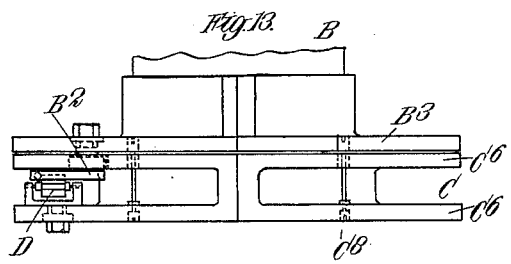
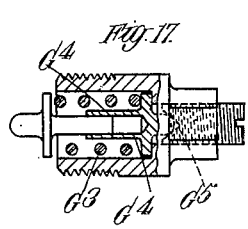
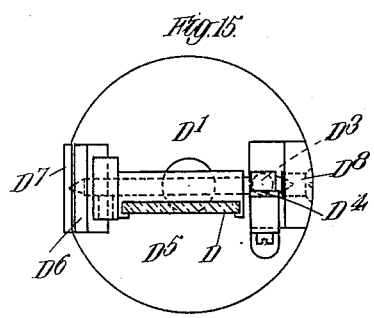
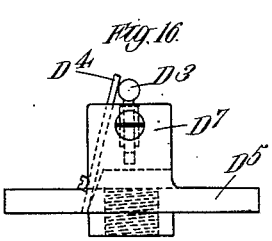
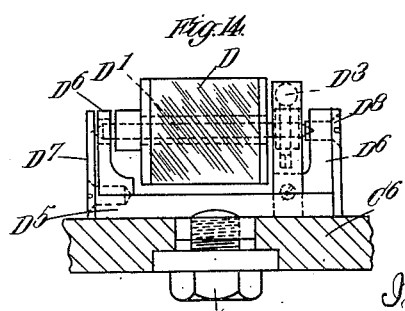
Witnesses:
V. E. Burner
W. Keane Nall
Inventors:
Bertram Hopkinson and Leonard G. P. Thring
By Edson Bro's, Attorneys

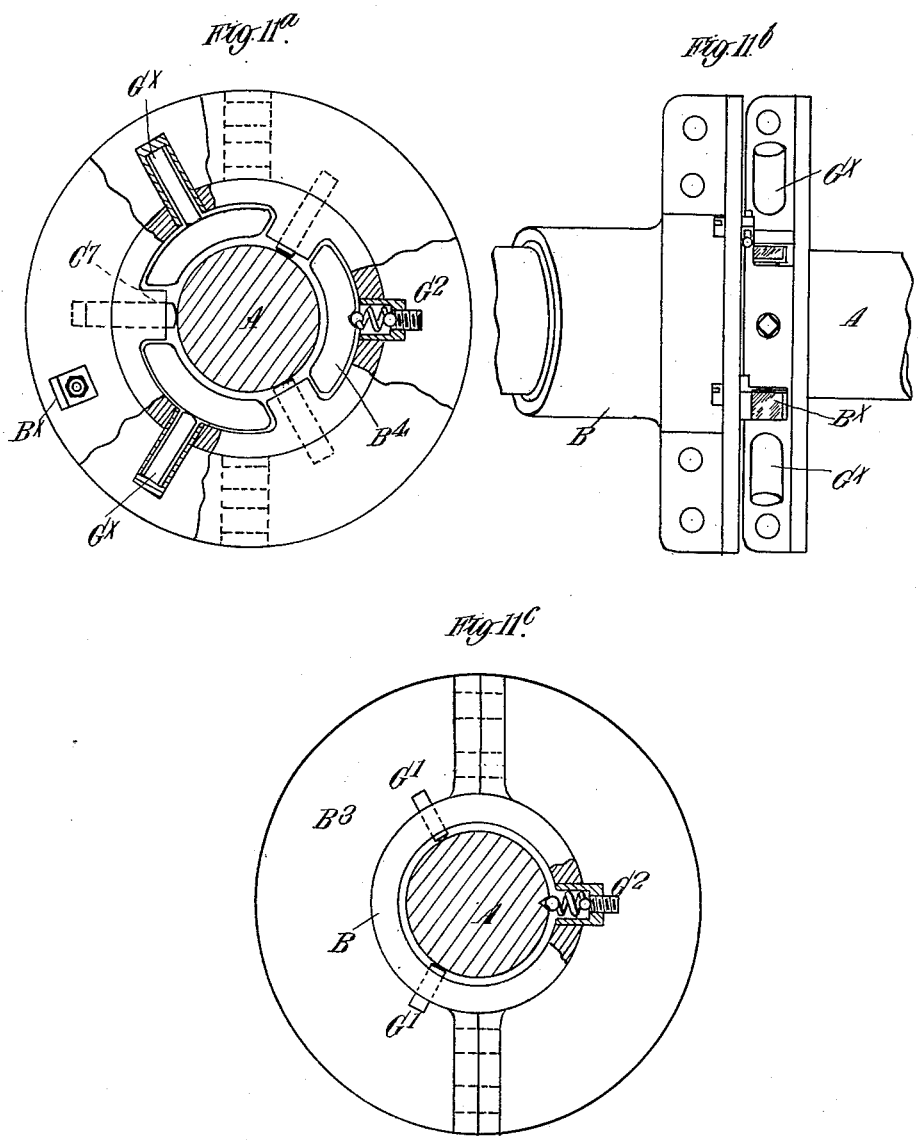

UNITED STATES PATENT OFFICE.

BERTRAM HOPKINSON AND LEONARD GODFREY PINNEY THRING, OF CAMBRIDGE, ENGLAND.

TRANSMISSION-DYNAMOMETER.

No. 904,432.  Specification of Letters Patent.  Patented Nov. 17, 1908.

Application filed June 11, 1907. Serial No. 378,328.

*To all whom it may concern:*

Be it known that we, BERTRAM HOPKINSON and LEONARD GODFREY PINNEY THRING, both subjects of the King of Great Britain, residing, respectively, at the Engineering Laboratory, Cambridge, and Walsingham, Millington Road, Cambridge, both in the county of Cambridge, England, have invented certain new and useful Improvements in Transmission - Dynamometers, of which the following is a specification.

This invention relates to transmission dynamometers the chief object being to enable the power transmitted by a rotating shaft to be accurately determined by measuring the angle of twist of the shaft between two points thereon at a definite distance apart while the shaft is rotating.

One feature of this invention consists in the employment of means whereby the small amount of twist undergone by the shaft is rendered visible, so that the amount thereof at any moment can be observed and measured.

A further feature of the invention consists in means whereby errors due to friction, vibration and the like are detected or eliminated. It will be understood that, since the angle of twist to be measured is very small, the means for eliminating the said errors form an important part of the invention.

For the purpose of this invention the rotating shaft, by which the power to be determined is transmitted, is provided with two members, which are attached to the said shaft at a definite distance apart and are provided with a mirror so mounted in relation to the aforesaid members that the relative angular displacement of the latter, due to the twist of the shaft between their points of attachment, is accurately imparted to the mirror. The movement of the mirror is rendered visible by allowing a beam of light to fall thereon and to be reflected to a suitable point of observation by the same.

In order that the said invention may be clearly understood and readily carried into effect, we will proceed to describe the same more fully with reference to the accompanying drawings in which:—

Figure 1 is a side elevation and Fig. 2 a plan of one arrangement embodying the main features of our invention. Figs. 3 and 4 are cross sections on the lines 1—1 and 2—2 of Fig. 1. Figs. 5 and 6 are respectively an elevation and plan of a scale employed with the source of light. Figs. 7 and 8 are respectively an enlarged front and side elevation of the mirror and mounting illustrated in Figs. 1 and 2. Fig. $8^a$ shows a modified arrangement of the mirror-actuating means. Fig. 9 is a plan and Fig. 10 an end view of a modified construction of attachment between the two members comprising the dynamometer. Figs 11, 12 and 13 are respectively an end elevation, cross-section, and plan of a further modified construction of our invention. Figs. $11^a$ and $11^b$ are a cross sectional elevation and side elevation respectively showing certain modified details, and Fig. $11^c$ is a sectional elevation similar to Fig. 11 but taken from the left of Fig. 12 and showing a modified arrangement for supporting the free end of the sleeve; Figs. 14, 15 and 16 are detail views of the mirror and its mounting employed with the modified construction shown in Figs. 11 to 13. Fig. 17 is a detail sectional view of a portion of the bearing shown in Fig. 11.

A is the shaft, and B, C, are the two members attached thereto.

D is the mirror, and E the source of light whereof the rays reflected by the mirror indicate the movement of the same.

Referring more particularly to Figs. 1 and 2, the member B, hereinafter called the sleeve, is clamped to the shaft A by radial screws B' or their equivalents. The other member C, hereinafter called the collar, is clamped in a similar manner by the screws C'. In the simplest construction, the sleeve and collar might be rigidly secured to the shaft quite independently of each other thus engaging only through the intervention of the mirror; but as the attachment of these members to the shaft merely by three or more screws would not usually be sufficiently rigid to obtain accurate results in practice, particularly if the sleeve is long in proportion to its diameter, we have shown in the figures now referred to a construction in which the attachment of the aforesaid members is reinforced by sliding bearings $C^2$ which connect the sleeve and collar together so as to permit only of rotational motion about the axis of the shaft, the sleeve B being arranged to fit accurately within the inner end of the collar C. The respective attachments of the sleeve and collar to the shaft at the points between which the twist is to be measured must not in this case be absolutely rigid but must permit small angular motions about an axis perpendicular to the axis of the shaft such as are necessary to accommodate the motion of the sleeve to that of the collar without straining the bearing between them. The mirror D is mounted on a spindle D', the latter being carried by the collar C and provided with a short arm $D^2$ which engages with an arm or actuating plate $B^2$ on the sleeve B so that any relative angular motion of the sleeve and collar causes the mirror to become angularly displaced about the axis of its spindle D'. The short arm $D^2$ is shown provided at its free end with a smooth anti-friction ball $D^3$ for engagement with the face of the actuating plate $B^2$, although it will be understood that the ball might be placed on the actuating plate $B^2$ in which case the short arm $D^3$ would terminate in a flat plate as shown in Fig. $8^a$. The ball $D^3$ is kept in contact with the actuating plate by the spring $D^4$ which is here shown secured to the said actuating plate.

It will be understood that we do not of course desire to limit ourselves to the ball and its actuating plate arrangement for imparting motion to the mirror as any other device adapted to perform this operation in a practically frictionless manner will answer our purpose.

In order that any relative motion of the sleeve and collar may cause angular motion of the mirror it is necessary that the bearing surface of the actuating plate $B^2$ be inclined to a line perpendicular to the spindle D' and the arm $D^2$. In Figs. 1 and 2 the angle between these directions is a right angle. The effect of varying this angle is to vary the amount by which the mirror is moved for the same angular movement of the actuating plate. The said actuating plate must also be inclined to the direction normal to the axis of the shaft, and the line joining the point of contact of the ball and the actuating plate to this axis.

The amount by which the mirror D is turned is proportional to the relative angular motion of the sleeve and collar and consequently to the angle of torsion of the shaft between their points of attachment. The axis of the mirror D is so disposed relatively to the axis of the shaft A that when a beam of light coming from the source of light E is reflected from said mirror and is received in the field of a telescope F, angular motion of the mirror about its spindle D' causes the reflected beam to traverse the field of the telescope. The beam of light emerging from the source E, which may conveniently be the filament of an electric lamp, is reflected onto the field of the telescope F once in every revolution of the shaft, so that said image appears as a bright line of light crossing the field of vision. The telescope F is provided with cross wires so as to permit the image of the source of light to be brought into the center of the field of vision before a load is applied to the shaft. The angular displacement imparted to the mirror, owing to the torsion of the shaft when transmitting power, causes the line of light in the field of vision of the telescope to move laterally, and the image is brought back again to the center of the field of vision of the telescope by adjusting the position of the source of light E along the scale E' on which said source of light is mounted to slide. The amount by which the source of light is moved along the scale serves as a measure of the angular displacement of the mirror, and consequently of the twist undergone by the shaft A between the points of attachment of the sleeve B and collar C.

It may here be stated that the sliding bearing $C^2$, which tends to prevent errors due to vibration, may be arranged otherwise than as shown.

It is convenient to be able to arrange the bearings between the sleeve and the collar or between these members and the shaft in such a manner as to permit relative motion of the sleeve and collar other than a pure rotation as friction between the parts can then be more easily eliminated. We therefore, in some forms of our invention, make use of the fact that relative motion between sleeve and collar will not produce any deflection of the mirror and therefore will cause no error in the reading provided that it is of such a character as to cause the ball to move parallel to the plane of the actuating plate. The same principle is applied in dealing with the mutual displacements of sleeve and collar which may arise from the bending of the shaft; the actuating plate being placed in such a position and with such an inclination that these displacements cause motion in the plane of the actuating plate only.

The above stated principles are applied to the constructions illustrated in Figs. 9 to 17.

Referring to Figs. 9 and 10, the sleeve B and the collar C are secured to the shaft at the points between which the twist is to be measured by the screws B' and C'. Bearings between the said sleeve and collar are afforded by the set screws $C^3$ and the rollers $C^4$, one of which may be controlled by a spring $C^5$. The collar is shown carrying two mirrors although it will be understood that only one need be employed. The ball $D^3$ on the end of the arm $D^2$ of each mirror D is pressed upon by an actuating plate $B^2$ of the sleeve B, and from a consideration of the planes in which the various parts are arranged, it will be seen that the above stated principles are involved. Small angular motions between sleeve and collar about one axis perpendicular to the axis of the shaft are not communicated to the mirror because the ball $D^3$ merely slides on the face of the plate $B^2$ while small angular motions about an axis perpendicular to the first mentioned axis are eliminated by the mutual adjustment of the sleeve and collar due to the turning of each about their points of attachment to the shaft.

In Figs. 11, 12 and 13 the collar C is in the form of a short member provided with a flange $C^6$ at each end and the sleeve is similarly flanged at the end $B^3$ which is adjacent to the collar. One member carries the mirror D and the other carries the projecting plate or mirror-actuating arm $B^2$. As shown, it is the collar which carries the mirror. The collar C is provided with three bosses $C^7$ which project through apertures in the extended portion $B^4$ of the sleeve B, the said bosses $C^7$ permitting three radial screws to engage with the shaft and thus secure the collar thereto.

Connection between the sleeve B and collar C is afforded by the two simple screws $G'$ and the resilient bearing $G^2$, the latter having a plunger controlled by a spring $G^3$ (Fig. 17) and adapted to slide within the central guide $G^4$, which is free to make small oscillations about its base at $G^5$.

In place of the rollers $C^4$ shown in Fig. 10, or of the rounded screws $G^1$ shown in Fig. 11, we may employ short columns $G^x$ as shown in Figs. $11^a$ and $11^b$, these columns having curved ends shaped to a definite and predetermined radius, the said ends being suitably constrained so that their movement on the collar or sleeve causes rolling friction as distinguished from sliding friction.

Instead of a sliding bearing between the collar C and the free end of the sleeve B as shown in Fig. 1, or instead of the connection shown in Fig. 11 between these parts, the free end of the sleeve may be supported directly upon the shaft as shown in Fig. $11^c$, where the two simple rounded screws $G^1$ and the resilient bearing $G^2$, similar to those shown in Fig. 11, connect the said sleeve directly to the shaft, the connection being functionally as in the other arrangements, that is to say, such that angular motion of this end of the sleeve is not restrained. The flanges of the sleeve and collar are yieldingly held together by steady springs $C^8$.

The mirror D is carried by a frame $D^5$ which is secured to the face of the flange $C^6$ of the collar C by a screw bolt $C^9$. The extremities of the spindle $D'$ on which the mirror is fixed are mounted between the lugs $D^6$ of the frame $D^5$. One of the said extremities bears upon a resilient plate or flat spring $D^7$, the opposite end being pressed upon by a set screw $D^8$. The actuating plate $B^2$ is secured to the flange $B^3$ of the sleeve B and operates against the spring $D^4$ which bears upon the ball $D^3$. It may here be stated that an advantage of employing large flanges $C^6$, $B^3$, is that the motion imparted to the mirror increases as its distance from the axis of the shaft increases, this arrangement being equivalent to increasing the distance between the points of attachment of sleeve and collar to the shaft. In this construction it will be seen that the principles hereinbefore mentioned are again involved owing to the fact that the axis of the mirror is arranged so as to lie in the plane of attachment of the collar to the shaft, and the plane of contact between the ball and plate is arranged so as to be parallel to the axis of the shaft.

Errors in reading, due to angular displacement of the sleeve and collar about axes at right angles to the shaft may be detected and allowed for by observing the reflections in mirrors fixed to these members, of a source of light if it is desired to dispense with the above described methods of construction for eliminating these errors. Similarly, bending or deflection of the shaft between the points of attachment of the sleeve and collar may arise from deflection occurring in the shaft at points beyond the length of shaft under consideration and thus cause error which though generally negligible may be similarly allowed for, if necessary, by fixing a mirror such as $B^x$, Figs. $11^a$ and $11^b$, rigidly to the sleeve B and adjusting the source of light E and telescope F so that the reflection of the light appears in the center of the field of the telescope when the shaft is at rest, and then observing the displacement of the image produced when the shaft revolves.

Although we have described the invention as carried into effect by the use of a telescope, the latter is not absolutely necessary. In place of the plane mirror D, a concave mirror may, for example be employed so as to focus the beam of light on to a semi-transparent scale which it traverses by an amount proportional to the angle of twist of the shaft.

As details of construction it may be mentioned that the position of the mirror and its actuating plate may be interchanged if necessary; also that the various points of contact between different parts may if desired be surrounded by leather washers or the like to prevent access of dust.

What we claim and desire to secure by Letters Patent of the United States is:—

1. A dynamometer for determining the power transmitted by a rotating shaft, comprising two members attached to said shaft at a definite distance apart, a mirror mounted on one of said members, and means whereby relative angular motion of the two members due to torsion of the shaft imparts angular motion to the mirror.

2. A dynamometer for determining the power transmitted by a rotating shaft, comprising two members attached to said shaft at a definite distance apart, a mirror mounted on one of said members, means whereby relative angular motion of the two members due to torsion of the shaft imparts angular motion to the mirror, and means for optically determining the extent of the aforesaid angular motion of the mirror.

3. A dynamometer for determining the power transmitted by a rotating shaft, comprising two members attached to said shaft at a definite distance apart, a spindle mounted on one of said members, a mirror carried by said spindle, a laterally projecting arm thereon, and an actuating plate engaging with said arm and carried by the other member.

4. A dynamometer for determining the power transmitted by a rotating shaft, comprising two members attached to said shaft at a definite distance apart, a spindle mounted on one of said members, a mirror carried by said spindle, a laterally projecting arm thereon, an actuating plate engaging with said arm and carried by the other member, an adjustably situated source of light directing a beam onto said mirror, and means whereby the deviation imparted to said beam, owing to torsion of the shaft, can be seen and determined in amount.

5. A dynamometer for determining the power transmitted by a rotating shaft, comprising two members attached to said shaft at a definite distance apart, a mirror mounted on one of said members, means whereby relative angular motion of the two members due to torsion of the shaft imparts angular motion to the mirror, and means whereby other small angular motions between the two members are not communicated to the mirror.

6. A dynamometer for determining the power transmitted by a rotating shaft, comprising two members attached to said shaft at a definite distance apart, a mirror mounted on one of said members, means whereby relative angular motion of the two members due to torsion of the shaft imparts angular motion to the mirror, means whereby other small angular motions between the two members are not communicated to the mirror, and means for optically determining the extent of the aforesaid angular motion of the mirror due to torsion of the shaft.

In testimony whereof we affix our signatures in presence of two witnesses.

BERTRAM HOPKINSON.
LEONARD GODFREY PINNEY THRING.

Witnesses:
T. A. G. COCKERTON,
E. FREEMAN.